United States Patent [19]

Birdsong

[11] Patent Number: 5,142,815
[45] Date of Patent: Sep. 1, 1992

[54] NIGHT LIGHT INSECT TRAP

[76] Inventor: Robert M. Birdsong, 6576 Hayes Dr., Riverdale, Ga. 30274

[21] Appl. No.: 788,145

[22] Filed: Nov. 7, 1991

[51] Int. Cl.$^5$ .............................................. A01M 1/04
[52] U.S. Cl. ........................................ 43/113; 43/114
[58] Field of Search .......................... 43/113, 114, 107; 220/476, 480, 475

[56] References Cited

U.S. PATENT DOCUMENTS

| | | | |
|---|---|---|---|
| 2,113,409 | 4/1938 | Niemeyer | 43/113 |
| 3,336,694 | 8/1967 | O'Connell | 43/113 |
| 3,348,332 | 10/1967 | O'Connell et al. | 43/113 |
| 3,465,468 | 9/1969 | Takamoto | 43/113 |
| 4,086,721 | 5/1978 | Deas | 43/113 |
| 4,212,129 | 7/1980 | Shumate | 43/113 |
| 4,700,506 | 10/1987 | Williams | 43/113 |
| 5,044,112 | 9/1991 | Williams | 43/113 |

FOREIGN PATENT DOCUMENTS 20529 6/1905 Austria ................................ 43/113

Primary Examiner—Richard K. Seidel
Assistant Examiner—Jeanne M. Elpel
Attorney, Agent, or Firm—Michael V. Drew

[57] ABSTRACT

A housing (20) fits over a night light (11) and attaches to the night light (11) through a slot (22) which is formed in the housing (20). The slot (22) fits around an indentation (19) in the outer portion of the socket (17) of a night light (11) which normally holds the cover over the night light (11). The housing (20) has a window opening (24) through which light from the night light (11) emanates. A transparent cover (26) is placed over the window (24). A receptacle (28) is attached to the housing (20) below the window cover (26). The receptacle (26) holds a substance (30) to which insects adhere. When insects are attracted to the light from the night light (11) they jump into or fly into the window cover (26) of the window (24). They then become stunned and fall into the receptacle (28) where they become trapped in the substance (30) in the receptacle.

10 Claims, 3 Drawing Sheets

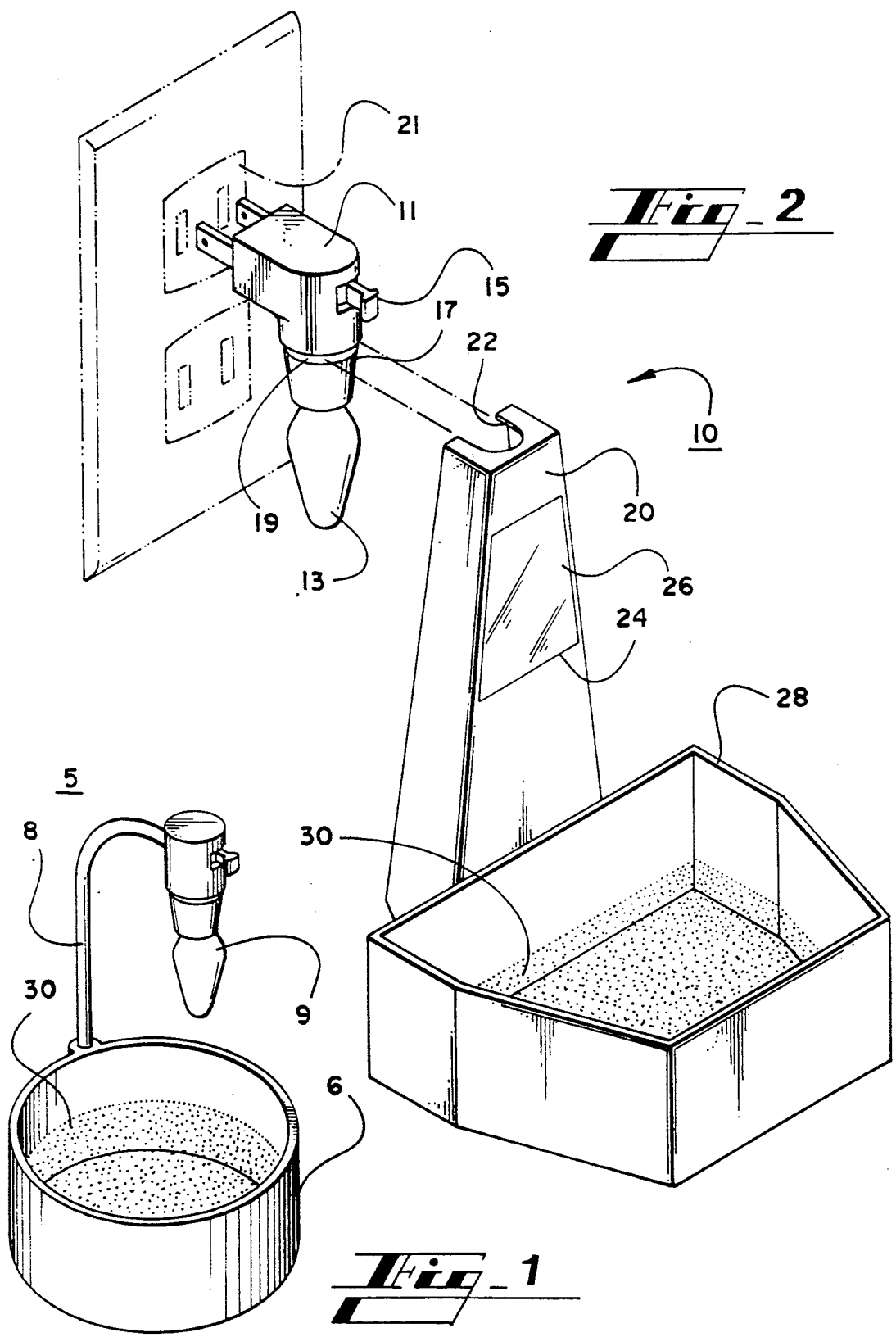

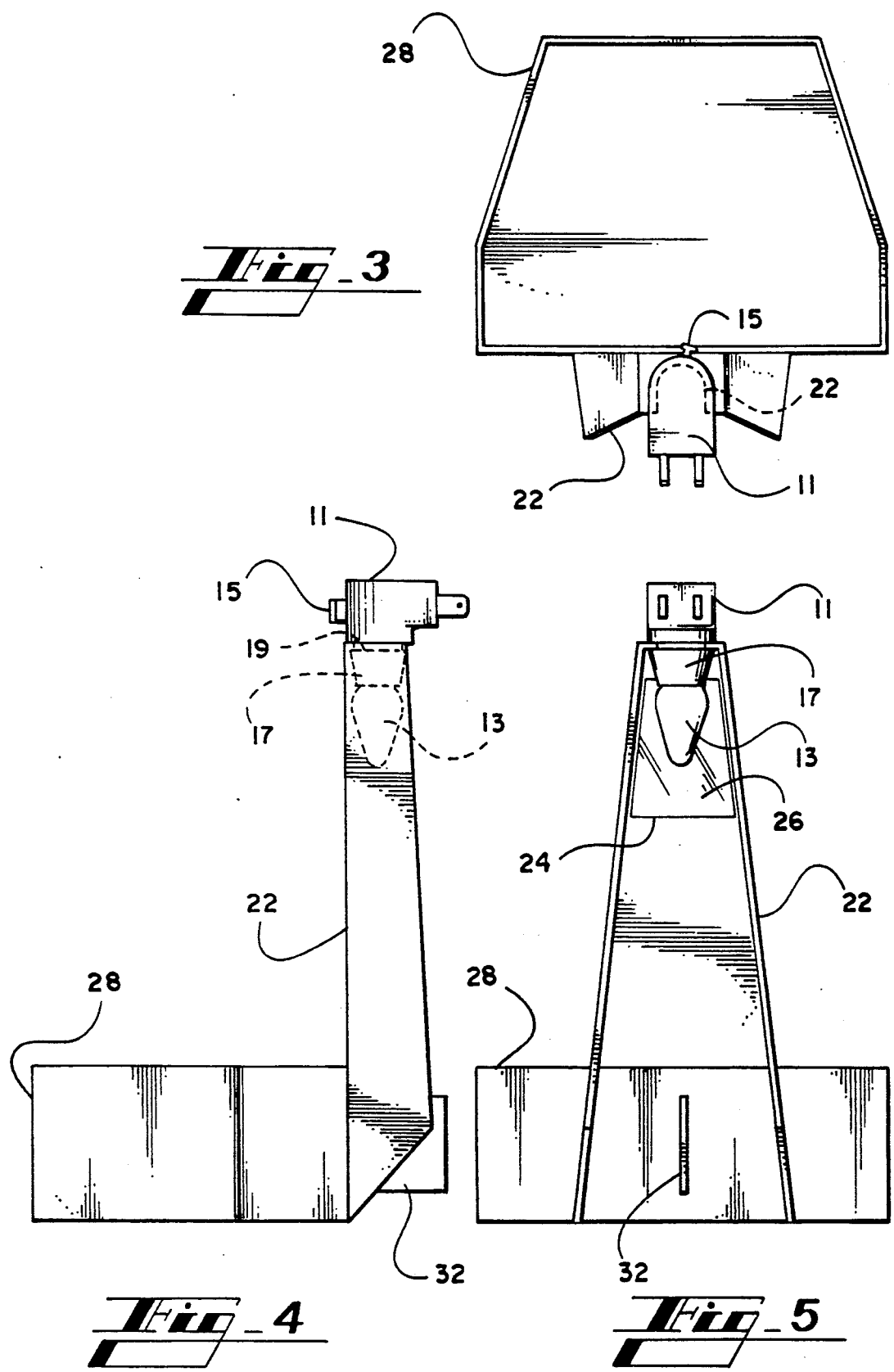

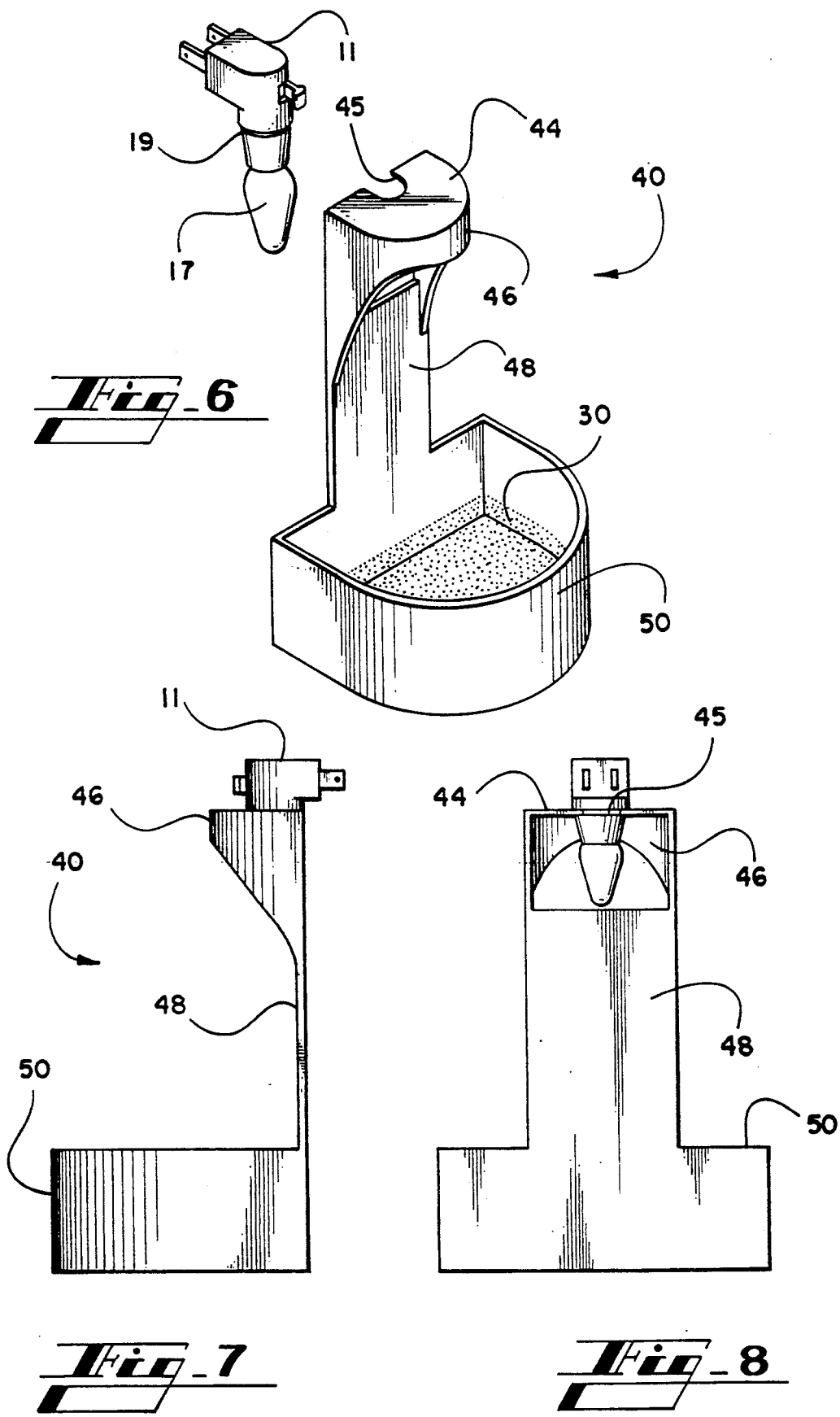

NIGHT LIGHT INSECT TRAP

TECHNICAL FIELD OF THE INVENTION

The present invention relates to insect traps, and more particularly to an insect trap which uses a night light to attract insects and which may be attached to a night light as a replacement for the night light cover.

BACKGROUND OF THE INVENTION

Insects such as fleas, mosquitos, moths and other flying insects are undesirable in buildings and homes because they are bothersome, destroy property and often pose health risks. It is desirable to destroy these insects. Insects often carry diseases, thus it is desirable to remove the insect from the premises once it has been destroyed. Another reason for removing insects from an environment is to prevent infestation of the area by unborn offspring which are carried in some form or another by many insects and which may still mature even though the parent insect is dead.

Various means have been used to destroy and remove insects from buildings and homes. A problem that must be overcome in destroying and removing insects is to get the insects to come into proximity with the means that will be used to eliminate them. It is known that many insects are attracted to light. It is desirable to have a means for eliminating insects using light to lure the insects. A night light is a ready light source. It would be convenient to have a means for eliminating insects that utilizes a night light as a lure for the insects.

SUMMARY OF THE INVENTION

It is an object of the invention to provide an inexpensive means for eliminating insects that uses light as a lure for the insects.

It is a further object of the invention to provide an inexpensive means for eliminating insects that uses a night light as a lure for the insects.

It is an additional object of the invention to provide an inexpensive insect trap which attracts, entraps and allows for easy disposal of insects.

In a simple embodiment of the present invention, a light source is suspended above a receptacle which holds a substance to which insects adhere. In other embodiments of the present invention, a housing fits over a night light and attaches to the night light by means of a slot which is formed in the housing. The slot in the housing fits around an indentation in the outer portion of the socket of a night light which normally provides support for the cover over the night light. In one embodiment of the invention, a rear wall extends down from a housing to a receptacle. The receptacle holds a substance to which insects adhere. When insects which are attracted to the light from the night light jump or fly into the light they become stunned and fall into the receptacle, or simply miss the light and fall into the receptacle, where they become trapped in the substance therein. In another embodiment which uses a housing, the housing has a window-like opening through which light from the night light emanates. A transparent cover is placed over the window-like opening. A receptacle is attached to the housing below the window cover. The receptacle holds a substance to which insects adhere. When insects which are attracted to the light from the night light jump into or fly into the cover of the window they become stunned and fall into the receptacle where they become trapped in the substance therein. Insects may also fall into the receptacle upon flying toward the light and falling short.

Other aspects, objects, features, and advantages of the present invention will become apparent to those skilled in the art upon reading the detailed description to preferred embodiments.

BRIEF DESCRIPTION OF THE DRAWINGS

FIG. 1 is an isometric illustration of an insect trap according to a simple embodiment of the invention.

FIG. 2 is an isometric view of an insect trap according to another embodiment of the present invention.

FIG. 3 is a top plan view of the insect trap of FIG. 2.

FIG. 4 is a side elevational view of the insect trap of FIG. 2.

FIG. 5 is a rear elevational view of the insect trap of FIG. 2.

FIG. 6 is an isometric illustration of an insect trap according to an additional embodiment of the present invention.

FIG. 7 is a side elevational view of the invention of FIG. 6.

FIG. 8 is a rear elevational view of the invention of FIG. 6.

DETAILED DESCRIPTION OF PREFERRED EMBODIMENTS OF THE INVENTION

While the specification concludes with claims particularly pointing out and distinctly claiming the subject matter which is regarded as the present invention, the invention will now be described with reference to the following description of embodiments taken in conjunction with the accompanying drawings.

All of the embodiments of the invention operate under the general phenomenon that many insects are attracted to light and will attempt to fly into or toward the light. When insects fly into or toward a light they may fall or otherwise travel downward either after becoming stunned or after flying toward the light and missing it. In all embodiments of the invention a receptacle is placed below a light source to catch and trap falling insects. The insects are trapped by placing a substance to which insects adhere within the receptacle. Referring first to FIG. 1, therein is shown an insect trap 5 that incorporates a simple embodiment of the invention. A light 9 is positioned above a receptacle 6 by means of a support 8. The receptacle 6 contains a substance 30 to which insects adhere. Thus, insects which fall into the receptacle 6 are trapped there. The receptacle 6 may also be decorative, for example, taking the shape of a jack-o-lantern or a Santa Claus figurine.

Other embodiments of the invention incorporate a night light as a convenient light source and as a support for conveniently positioning the insect trap. A night light which plugs into a wall outlet provides a convenient location for positioning an insect trap that is generally away from the path of travel of persons walking about in an environment. The location of an insect trap at a receptacle also places it closer to certain non-flying insects such as fleas. The night light also eliminates the need for a cord or for batteries as an energizing source. Referring now to FIG. 2, in a preferred embodiment of the invention an insect trap 10 is configured to snap onto a night light 11. The insect trap 10 fits onto the night light 11 in the same manner that a cover for the night light 11 would attach to the night light 11. A typical night light 11 has a bulb 13 which fits into a socket 17 and also has a switch 15. The night light cover and insect trap 10 attach around an indentation in the socket 19 of the night light 11. The main supporting portion of the insect trap 10 is a housing 20. The housing 20 illustrated is elongated and has a slot 22 at its upper end for clipping onto the indentation 19 in the socket 17 of the night light 11. The slot 22 is slightly smaller than the diameter of the indentation 19 so that a snug fit is achieved. This works particularly well when the housing 20 is constructed of material such as plastic which flexes slightly. The housing 20 has a window opening 24 for allowing light to shine through. A transparent cover 26 fits over the window opening 24. A receptacle 28 is attached to the housing 20 below the window cover 26. The receptacle is illustrated as containing a substance 30 to which insects adhere.

Referring now to FIGS. 3, 4 and 5, therein can be seen views of the housing 20 snapped onto a night light 11. In the top view of FIG. 3, the receiving area presented by the receptacle 28 is visible. The receptacle 20 receives, or catches, insects that fall downward from the housing 20. In the side view of FIG. 4, the manner in which the housing 20 encloses the light bulb 13 of the night light 11 is shown. FIG. 4 also illustrates a support member 32 which is attached to the housing in order to provide additional support for the insect trap 10 when it is snapped onto a night light. The support member 32 engages a wall which holds the receptacle 21, shown in FIG. 2, when the night light 11 is plugged in and the housing 20 is snapped into place. By engaging the wall, the support member 32 creates a supporting torque or counter torque to the torque caused by the weight of the receptacle 28 and housing 20 actinq' through the length of the housing 20. The support member is optional because the housing may be formed to engage the wall along its entire length. This would eliminate the need for additional support. However, in instances where the lower end of the housing 20 does not come into contact with the wall which holds the outlet 21 for the night light 11, the support member 32 adds additional support. In the rear view of FIG. 5, the alignment of the window opening 24, window cover 26 and light bulb 13 is shown. FIG. 5 also further illustrates the support member 32.

When the light bulb 13 of the night light 11 is turned on it shines through the window opening 24 and window cover 26. Fleas and many flying insects such as mosquitoes and moths are attracted to light and attempt to jump or fly into the light. When these insects do so, they impel themselves into the window cover 26 and thereby become stunned and fall into the receptacle 28. The receptacle 28 contains a substance 30 to which insects adhere thereby trapping the fallen insects.

Referring now to FIG. 6, therein is shown an insect trap 40 according to an additional preferred embodiment of the invention. This preferred embodiment also uses a housing 42 that snaps onto the indentation 19 of a socket 17 of a night light 11. The housing 42 has a top 44 which has a slot 45 for receiving the indentation 19 in the socket 17 of a night light 11. A front wall 46 extends from the top 44 and is connected to a rear wall 48. The top 44 and front wall 46 provide the support for the insect trap 40 to be connected to the night light 11. The rear wall extends downward and supports a receptacle 50. The receptacle holds a substance to which insects adhere.

Referring now to FIG. 7, therein is illustrated a side view of the invention of FIG. 6. This view illustrates the insect trap 40 fitted over a night light 11. From this view and that of FIG. 6 it can be appreciated that insects attracted to light emanating from the night light will become stunned upon hitting the light bulb 9, the front wall 46 of the housing 42 or rear wall 48 and fall into the receptacle 50.

Referring now to FIG. 8, therein is illustrated a rear elevational view of the insect trap 40. This view reveals an opening formed by the front wall 46 and rear wall 48 that permits a night light 11 to be inserted and withdrawn from the insect trap 40.

For each embodiment of the invention, an inexpensive substance 30 which works well is liquid detergent such as dish-washing or laundry detergent. When insects fall into the liquid detergent they can not easily escape and remain there. They may drown or die from other causes while trapped. Trapped insects may be disposed of at the convenience of the user. The receptacle may easily be completely rinsed clean if desired. The dish-washing liquid may be diluted to further reduce the cost of using the invention. Another suitable substance to which insects adhere is sticky paper such as so-called fly-paper. When using such paper it may be replaced as desirable or necessary upon retaining insects.

In the embodiments of FIGS. 2–6, the entire housing may be made of light-transmitting material such as clear plastic. This would allow light to generally emanate from the housing creating a more alluring target for insects.

As should be apparent from the foregoing specification, the invention is susceptible to being modified with various alterations and modifications which may differ from those which have been described in the preceding specification and description. Accordingly, the following claims are intended to cover all alterations and modifications which do not depart from the spirit and scope of the invention.

What is claimed is:

1. An insect trap for use with a night light which has a removable cover comprising:
   a housing defining a window for transmission of light emanating from a bulb of the night light, and defining a slot for receiving an indentation in a socket of the night light which holds the removable cover of the night light;
   a light-transmitting cover for said window; and
   a receptacle attached to said housing vertically disposed below said window of said housing for receiving insects which fall after hitting said light-transmitting cover for said window and for holding a substance to which insects adhere;
   whereby insects are attracted to light emanating from the night light and impel themselves into said light-transmitting cover of said window becoming stunned and fall into said receptacle containing said substance to which insects adhere.

2. The invention of claim 1, wherein said housing is elongated.

3. The invention of claim 1, wherein said slot is slightly smaller than the indentation in the socket of the night light for closely engaging the indentation.

4. The invention of claim 1, further comprising said substance to which insects adhere.

5. The invention of claim 4, said substance to which insects adhere comprising liquid detergent.

6. The invention of claim 1, further comprising a support member affixed to said housing for engaging a wall when said housing is placed over the night light.

7. In combination with a night light which has a removable cover the improvement comprising:
- a housing defining a window for transmission of light emanating from a bulb of the night light, and defining a slot for receiving an indentation in a socket of the night light which holds the removable cover of the night light;
- a light-transmitting cover for said window; and
- a receptacle attached to said housing vertically disposed below said window of said housing for receiving insects which fall after hitting said light-transmitting cover for said window and for holding a substance to which insects adhere;

whereby insects are attracted to light emanating from the night light and impel themselves into said light-transmitting cover of said window becoming stunned and fall into said receptacle containing said substance to which insects adhere.

8. The invention of claim 7, wherein said housing is elongated.

9. The invention of claim 7, wherein said slot is slightly smaller than the indentation in the socket of the night light for closely engaging the indentation.

10. The invention of claim 7, said substance to which insects adhere comprising liquid detergent.

* * * * *